United States Patent
Gueguen et al.

(10) Patent No.: US 12,235,651 B1
(45) Date of Patent: Feb. 25, 2025

(54) AUTONOMOUS NAVIGATION CORRECTION SYSTEM

(71) Applicant: Amazon Technologies, Inc., Seattle, WA (US)

(72) Inventors: Lionel Gueguen, Erie, CO (US); Ben James Kadlec, Boulder, CO (US); Denver H. Dash, Longmont, CO (US); Drew Steedly, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 862 days.

(21) Appl. No.: 17/215,594

(22) Filed: Mar. 29, 2021

(51) Int. Cl.
| | | |
|---|---|---|
| *G05D 11/00* | (2006.01) | |
| *G05D 1/00* | (2006.01) | |
| *G06N 20/00* | (2019.01) | |
| *G06T 7/50* | (2017.01) | |
| *G06T 7/90* | (2017.01) | |

(52) U.S. Cl.
CPC ......... *G05D 1/0238* (2013.01); *G05D 1/0274* (2013.01); *G06N 20/00* (2019.01); *G06T 7/50* (2017.01); *G06T 7/90* (2017.01); *G06T 2207/10028* (2013.01); *G06T 2207/20081* (2013.01)

(58) Field of Classification Search
CPC ........... G05D 1/0238; G06T 7/50; G06T 7/90; G06T 2207/10028; G06T 2207/20081; G06N 20/00
USPC .......................................................... 701/23
See application file for complete search history.

(56) References Cited

U.S. PATENT DOCUMENTS

| | | | |
|---|---|---|---|
| 8,989,944 B1* | 3/2015 | Agarwal | G01S 15/86 340/576 |
| 10,528,823 B2* | 1/2020 | Guo | G06T 7/10 |
| 11,087,494 B1* | 8/2021 | Srinivasan | G01S 17/89 |
| 11,126,891 B2* | 9/2021 | St. Romain, II | G06F 18/2148 |
| 11,734,845 B2* | 8/2023 | Guizilini | G06V 20/647 382/104 |
| 2018/0350086 A1* | 12/2018 | Sweet, III | G01C 15/002 |
| 2019/0004535 A1* | 1/2019 | Huang | H04N 13/254 |
| 2019/0035100 A1* | 1/2019 | Ebrahimi Afrouzi | G06V 10/751 |
| 2019/0073518 A1* | 3/2019 | Rao | H04B 10/1143 |
| 2020/0018852 A1* | 1/2020 | Walls | G01S 7/4972 |
| 2021/0073584 A1* | 3/2021 | St. Romain, II | G06N 5/04 |
| 2021/0125320 A1* | 4/2021 | Kim | G06N 3/08 |

(Continued)

FOREIGN PATENT DOCUMENTS

| | | | | |
|---|---|---|---|---|
| EP | 3637141 A1 * | 4/2020 | ........... | G01B 11/005 |
| WO | WO-2020190781 A1 * | 9/2020 | ......... | G06K 9/00201 |
| WO | WO-2021041854 A1 * | 3/2021 | ........... | G01S 17/894 |

*Primary Examiner* — Tuan C To
(74) *Attorney, Agent, or Firm* — Eversheds Sutherland (US) LLP

(57) ABSTRACT

Systems, methods, and computer-readable media are disclosed for determining obstacle data based on sensor data such as greyscale data and depth data. Based on the obstacle data navigation data may be determined and used by an autonomous vehicle to navigate an environment such as a warehouse or storage facility. The obstacle data may be determined by determining three-dimensional representations of the greyscale data and the depth data and segmented and combining or fusing the three-dimensional representations of the greyscale data and the depth data. The system used to determine the obstacle data may be trained to avoid false obstructions and omitted obstructions.

16 Claims, 12 Drawing Sheets

(56) References Cited

U.S. PATENT DOCUMENTS

2021/0248777 A1* 8/2021 Dekarz ................ G06V 10/806
2021/0390351 A1* 12/2021 St. Romain, II .... G06F 18/2178
2022/0114752 A1* 4/2022 Kavulya ................... G06T 7/74
2023/0062296 A1* 3/2023 Ricard ................ H04N 19/597

* cited by examiner

AUTONOMOUS NAVIGATION CORRECTION SYSTEM

BACKGROUND

Ecommerce and the global marketplace have resulted in an a high volume of products being purchased online and shipped across the world. Often times products are stored in large facilities and must be transported for storage, distribution, and/or shipping. Products may be stored in one area of a facility and transported to another area of the facility for distribution and/or shipping. While individuals traditionally were responsible for moving products about a facility, recently autonomous vehicles have performed this task. Autonomous vehicles may be programed to navigate the facility and move products and/or packages (e.g., boxes), from one location to another. For example, products may be received at one location and relocated to another location for storage. Autonomous vehicles use sensors to detect and identify obstacles in the environment and to determine navigation of the autonomous vehicles. However, it may be difficult to accurately decipher between obstacles and traversable detections (e.g., reflections on the floor). Further, it may be difficult to identify certain obstacles (e.g., chain link fence).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

The systems and methods herein may be used to determine obstacle data, an obstacle map and/or navigation data based on sensor data such as greyscale and depth data, for example. An autonomous vehicle may be designed to navigate an environment such as a warehouse or storage facility, for example, and may have one or more sensors to generate information about the surrounding environment. For example, one or more stereo sensors may be employed to generate information about the surrounding environment. The sensor data may include both depth data and greyscale data.

The sensor data may be sent from the autonomous vehicle to a computing device to process the sensor data. Specifically, the greyscale data may be processed by a perspective module to determine a three-dimensional representation of the greyscale data. Greyscale perspective data from the perspective module may be processed by a projection module which may determine a perspective views of the greyscale perspective data (e.g., top down views) and may further segment the three-dimensional representation of the greyscale data. It is understood that greyscale data may be any type of data with color information (e.g., red-green-blue (RBG) data and/or greyscale data).

The depth data may be processed by a depth point cloud module to determine a three-dimension point cloud corresponding to the depth data. A depth segmentation module may process the three-dimensional point cloud to determine perspective views of the depth point cloud (e.g., top down views) and may further segment the depth point cloud resulting in depth segmentation. The segmented depth data and greyscale data may then be fused together via a fusion module. The fusion module may further determine obstacle data (e.g., information) from the fused depth data and greyscale data and may be used to determine navigation data for the autonomous vehicle.

The perspective module, projection module, depth point cloud module, depth segmentation module and/or fusion module may be the same or different modules. The perspective module, projection module, depth point cloud module, depth segmentation module and/or fusion module may be trained using datasets including false obstacle detections and/or obstacle omissions to improve the accuracy one or more of the models. With improved accuracy the autonomous vehicle may reduce the occurrence of time consuming navigation corrections and/or collisions due to errors in the obstacle and/or navigation data.

Figure 1:
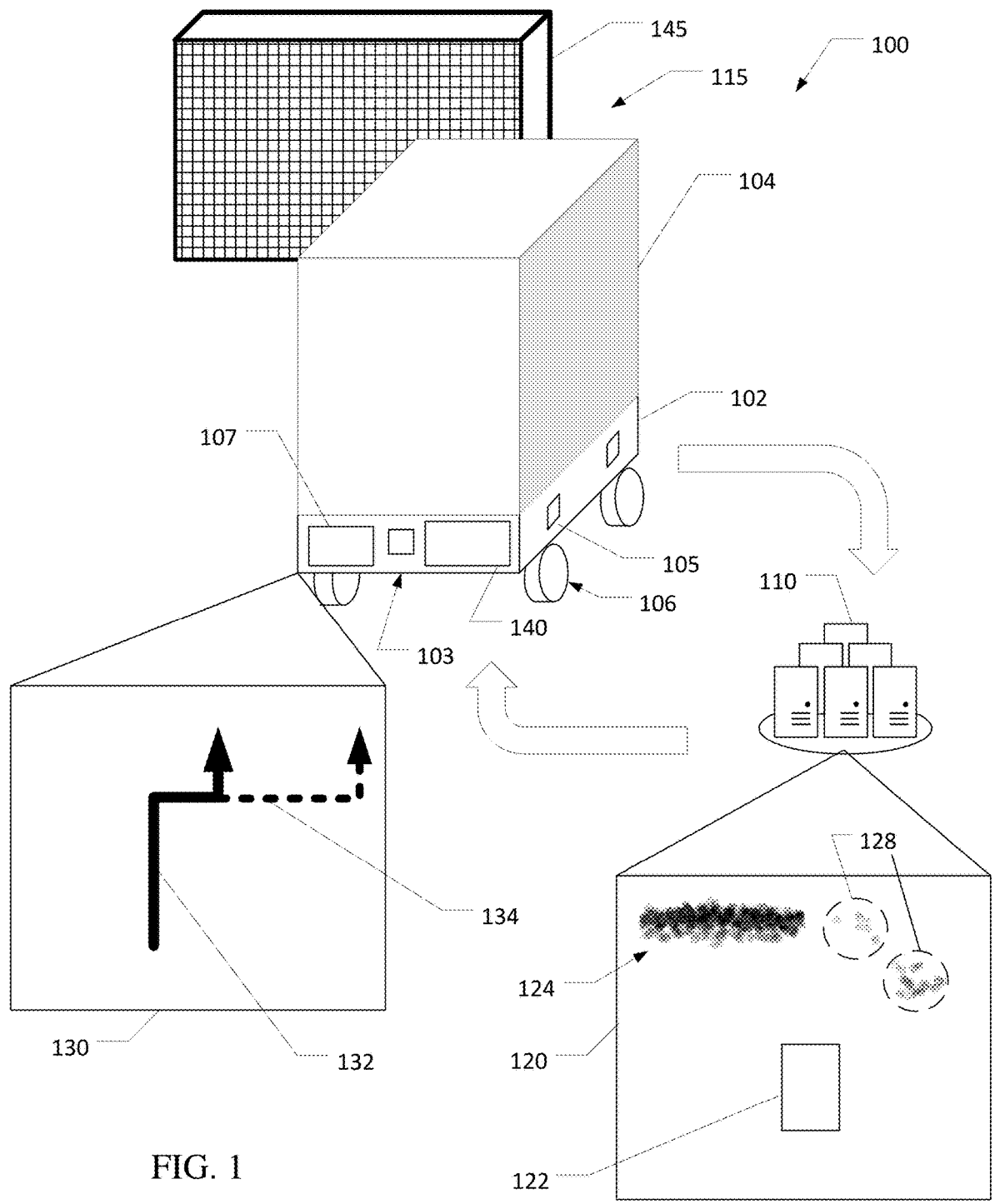
FIG. 1 is a schematic illustration of an example use case for determining an obstacle map and corresponding navigation, in accordance with one or more example embodiments of the present disclosure.

Referring to FIG. 1, an example use case 100 for determining sensor data, processing the sensor data to determine obstacle data, and determining navigation data based on the obstacle data is illustrated in accordance with one or more example embodiments of the disclosure. In the illustrated example, vehicle 102, which may be an autonomous vehicle, may communicate wirelessly with a computing device 110, which may be one or more computing devices and/or servers. Vehicle 102 may include one or more sensors 105 that may generate sensor data and may communicate the sensor data to computing device 110. Vehicle 102 may further include computing device 140.

Computing device 110 may be any computing device that may communicate with computing device 140, one or more servers and/or other computing devices, via any well-known wired or wireless system (e.g., Wi-Fi, cellular network, Bluetooth, Bluetooth Low Energy (BLE), near field communication protocol, etc.). Computing device 110 may be any computing device with a processor. In the example illustrated in FIG. 1, computing device 110 may be laptop, desktop computer, server, or even a smart phone, tablet, wearable device, or the like. Computing device 110 may run one or more local applications to facilitate communication between computing device 110, computing device 140 and/or any other computing devices or servers and otherwise process instructions and/or perform operations described herein. The local application may be one or more applications or modules run on and/or accessed by computing device 110.

Computing device 140 may be any computing device that may communicate with computing device 110, one or more servers and/or other computing devices, via any well-known wired or wireless system (e.g., Wi-Fi, cellular network, Bluetooth, Bluetooth Low Energy (BLE), near field communication protocol, etc.). Computing device 140 may be any computing device with a processor. Computing device 140 may run one or more local applications to facilitate communication between computing device 110, computing device 140 and/or any other computing devices or servers and otherwise process instructions and/or perform operations described herein. The local application may be one or more applications or modules run on and/or accessed by computing device 140.

As shown in FIG. 1, vehicle 102 may be an autonomous vehicle and may include a base portion 103 and optionally a compartment portion 104. For example, the compartment portion 104 may be include several walls or similar structures to contain products and/or packages. Base portion 103 may further include one or more wheels 106 or other transportation system (e.g., tracks) and may also include a power system 107 including a motor and/or controller to power and control the transportation system, respectively. It is further understood that the power system may include a battery. The computing device 140 may be in communication with the power system 107 and/or sensors 105.

Sensors 105 may be distributed about base portion 103 and/or compartment portion 104. Sensors 105 may be any well-known sensor for determining greyscale and depth image data. For example, sensors 105 may be stereo sensors or the like. In one example, the same sensor may generate signals corresponding to greyscale and depth data. In another example, different sensors may generate signals corresponding to greyscale and depth data. It is understood that one or more different type of sensors may be employed in addition to or alternative to sensors for generating greyscale and depth data (e.g., proximity sensors). For example, sensors 105 may include one or more cameras.

In one example, six sensors may be placed about base portion 103 and may generate a signal communicated to computing device 140. For example, a first sensor may be positioned on the front of the base portion 103, a second sensor may be positioned on the back of base portion 103, a third and fourth sensor may be positioned on the left side of the base portion 103 and a fifth and six sensor may be positioned on the right side of the base portion 103. It is understood the one sensor on the right and left side may be forward facing and one sensor on the right and left side may be backward facing. It is further understood that any other number of sensors or sensor arrangements may be employed.

As shown in FIG. 1, vehicle 102 may be situated in environment 115, which may be a warehouse or storage facility, for example, which may include one or more obstructions such as obstruction 145, which may be a fence and/or wall. Sensors 105 may generate sensor data corresponding to greyscale and depth data that may indicate the presence of obstruction 145. Vehicle 102 and specifically computing device 140 may be programmed to continuously or periodically generate sensor data and communicate the sensor data to computing device 110 via well-known wireless technologies. As shown in FIG. 1, if vehicle 102 continues forward it will collide with obstruction 145.

Computing device 110 may be located in or near the environment 115 or may be a remote computing device such as a remote server. Computing device 110 may periodically receive sensor data from vehicle 102 (e.g., from computing device 140). Computing device may process the sensor data to determine obstacle data (e.g., corresponding to obstacle 145) which may be periodically sent to vehicle 102 based on the sensor data. For example, computing device 110 may determine greyscale data and depth data from the sensor data and may process the grayscale data using a perspective module to determine three-dimensional greyscale perspective data and may process the perspective data using a projection module to segment the greyscale perspective data to determine greyscale segmentation.

Computing device 110 may process the depth data using a depth point cloud module to determine a three-dimensional point cloud and may process the point cloud using a depth segmentation module to segment the depth point cloud. The depth segmentation and the greyscale segmentation may be fused to determine a combined three-dimensional representation and may further determine a top down view of the representation.

Based on the three-dimensional representation of fused greyscale and depth data, an obstacle map 120 may be generated including obstacle data. The obstacle map 120 may be based on three-dimensional representation of fused greyscale and depth data. For example, the obstacle map may be a top down view of the obstacle data. One or more modules and/or models of computing device 110 may determine, based on the obstacle data, obstacle representations (e.g., representation 124 and representations 128) on obstacle map 120 that may be oriented with respect to vehicle representation 122.

Figure 7A:
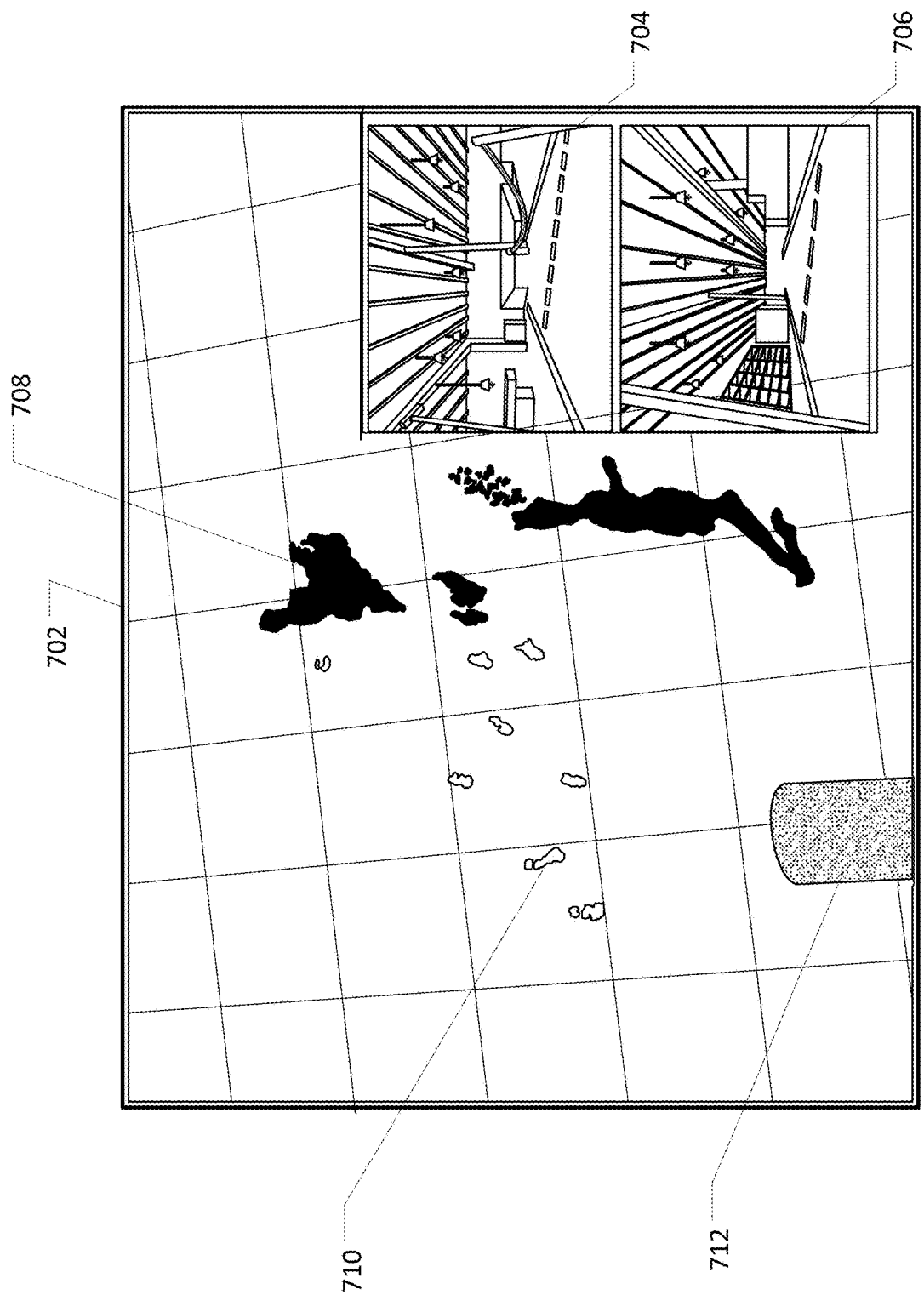
FIGS. 7A-7B are schematic illustrations of obstacle maps in accordance with one or more example embodiments of the disclosure.
Figure 7B:
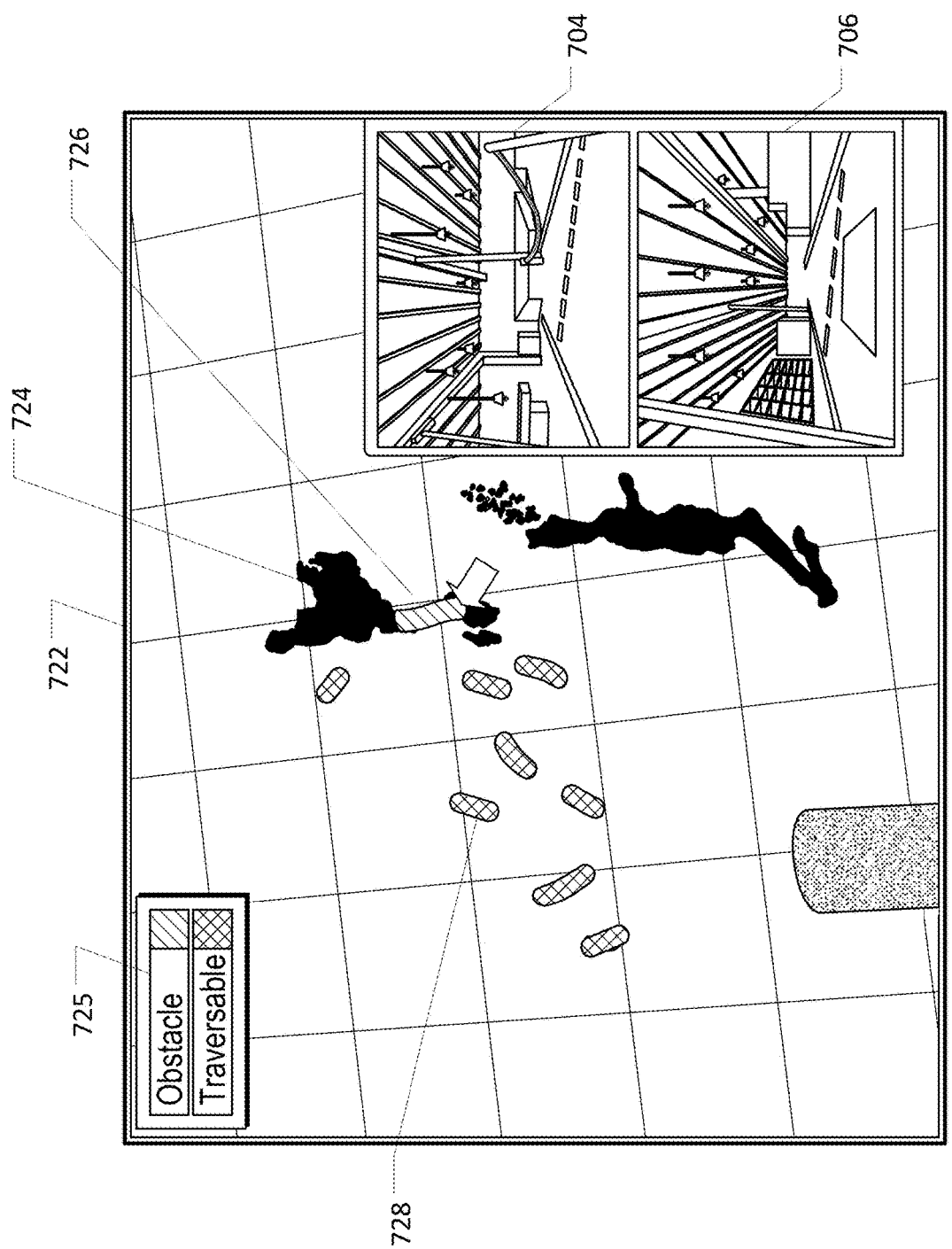

Computing device 110 may train one or more modules and/or models used to determine the obstacle data using datasets with known obstructions including false detections of obstructions and omissions of obstructions. Based on this information, one or more modules and/or models may be trained to more accurately detect such false detections and omissions. It is understood that the one or more algorithms or models may be one or more neural networks. FIGS. 7A-B, described below, detail the an exemplary process for training the on one or more modules and/or models. In one example, a trained model may determine that representations 128 are really reflections on the floor and thus are not non-traversable obstacles. Accordingly, computing device 110 may disregard representations 128 or cause vehicle 102 to disregard such representations 128.

Computing device 110 may communicate the obstacle map 120 and/or obstacle data indicative of the obstacle map to the vehicle 102. Vehicle 102, and specifically computing device 140, may determine navigation data 130 based on the obstacle map 120 and/or obstacle data. For example, computing device 110 may disregard representations 128 and thus computing device 140 may determine navigation 132 that travers the false detections on the floor. Navigation 134 represents a navigation that navigates around the false detections.

As shown in FIG. 1, the improved obstacle map 120 and/or corresponding obstacle data that disregards the false detections corresponding to representations 128 results in a more direct navigation path that saves time and resources. It is understood that the trained modules and/or models of computing device 110 may similarly identify omissions. For example, greyscale data may not indicate the presence of an obstacle but the depth data may indicate the obstacle and thus the fused representation of depth data and greyscale data may result in identification of the obstacle, or vice versa.

Illustrative Process and Use Cases

Figure 2:
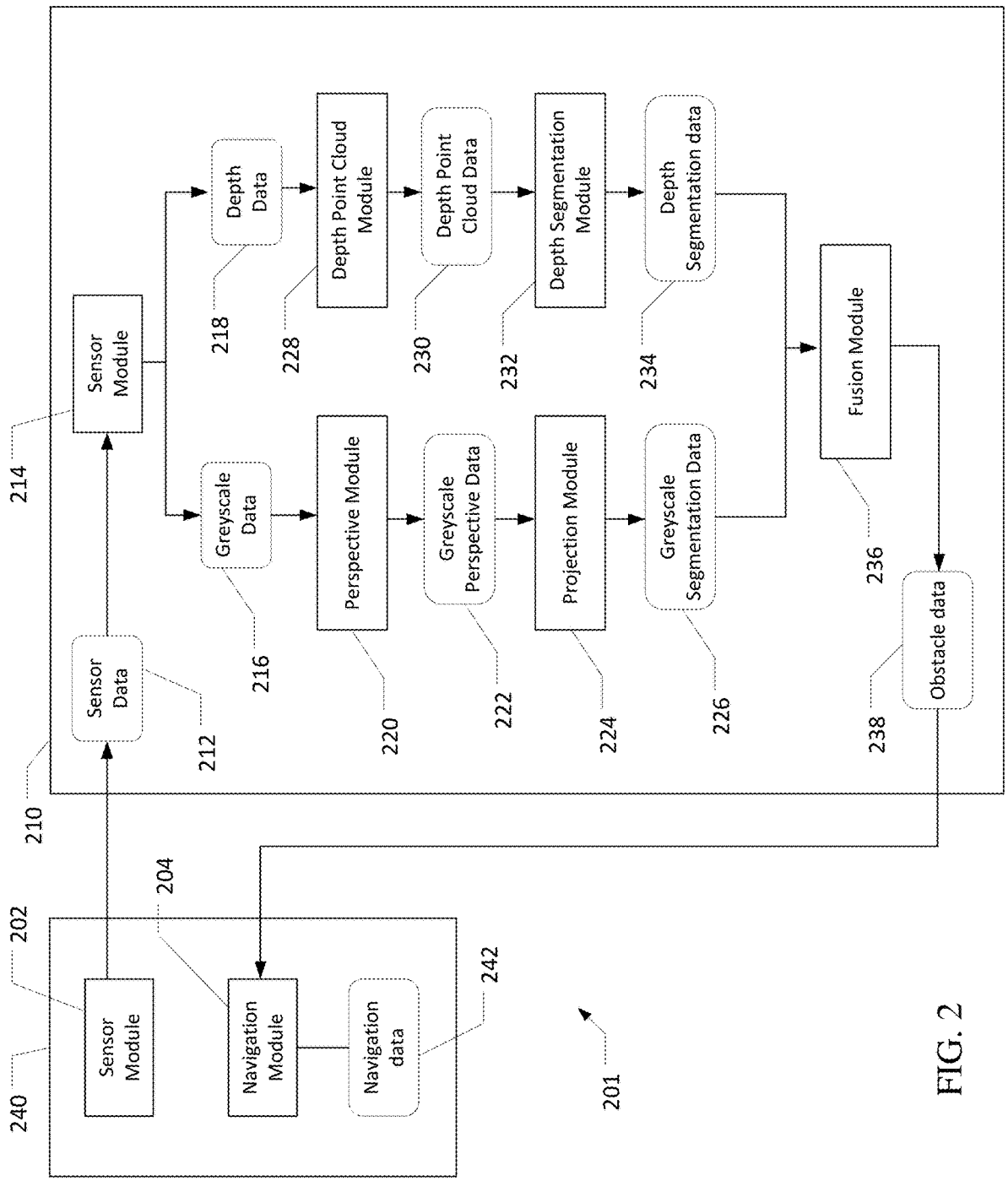
FIG. 2 is a schematic illustration of a data flow of for processing greyscale and depth data, in accordance with one or more example embodiments of the present disclosure.

FIG. 2 depicts a schematic block diagram of an exemplary navigation system 201 for determining obstacle data and navigation data based on greyscale data and depth data, in accordance with one or more example embodiments of the disclosure. Some or all of the blocks of the process flows in this disclosure may be performed in a distributed manner across any number of devices (e.g., computing devices and/or servers). Some or all of the operations of the process flow may be optional and may be performed in a different order.

As shown in FIG. 2, computing device 240, which may be the same as computing device 140, may communicate with computing device 210, which may be the same as computing device 110. Computing device 240 may include sensor module 202 and navigation module 204. Sensor module 202 may determine sensor data obtained and/or determined by one or more sensors on the vehicle. The one or more sensors may be similar to sensors 105 and may generate data such as greyscale data and/or depth data.

Figure 3A:
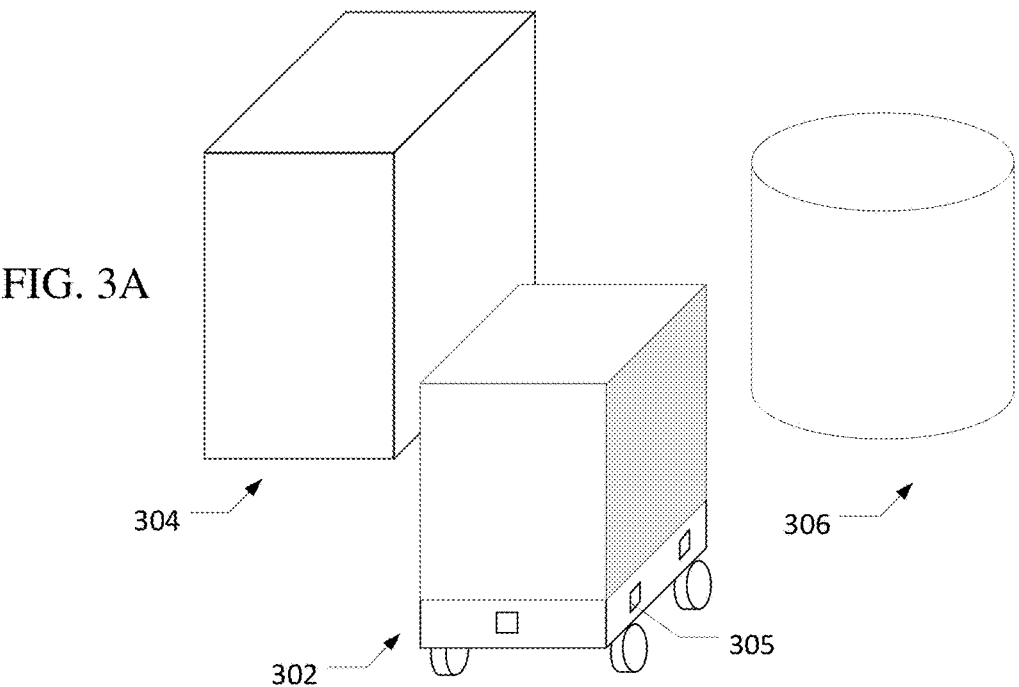
FIGS. 3A-3C are schematic illustrations of determining sensor data, multi-dimensional data, and perspective data, in accordance with one or more example embodiments of the present disclosure.

For example, referring to FIG. 3A, an exemplary schematic illustrations of determining sensor data is depicted in accordance with one or more example embodiments of the present disclosure. As shown in FIG. 3A, vehicle 302 including a computing device may generate sensor data using one or more sensors 305. Sensors 305 may be the same as sensors 105. Sensors 305 may be arranged on vehicle 302 and may detect sensor data such as greyscale data and depth data corresponding to the surrounding environment which may include obstacle 304, which may be rectangular in shape, and obstacle 306, which may be cylindrical in shape.

Referring again to FIG. 2, computing device 240 may send sensor data 210 to computing device 210. Computing device 210 may include sensor module 214, perspective module 220, projection module 224, depth point cloud module 228, depth segmentation module 232, and fusion module 236. Computing device 210 may process sensor data 212 with sensor module 214. Sensor module 214 may determine greyscale data 216 and/or depth data 218. Sensor module 214 may further preprocess the sensor data 212 to reduce or eliminate noise.

Greyscale data 216 may be indicative of greyscale images. Greyscale data 216 may correspond to color information from the environment in which the sensors are situated and/or may correspond to shades of grey. It is understood that greyscale data 216 may be any type of data with color information (e.g., red-green-blue (RBG) data and/or greyscale data). Depth data may correspond to data generated by depth sensors (e.g., high fidelity depth sensors) and may include three-dimensional depth information that corresponds to depth. It is understood the greyscale data and the depth data may correspond to the same environment and may be from the same perspective and/or vantage point.

Computing device 210 may communicate greyscale data 216 to perspective module 220. Perspective module 220 may be one or more algorithms and/or models that are designed and/or trained to determine a three-dimensional presentation of the greyscale data 216 based on the color information and/or shades of grey. The perspective module 220 may process greyscale data 216 to determine and/or generate greyscale perspective data 222 which may be a three dimensional representation of greyscale data 216, including depth information.

Computing device 210 may process the greyscale perspective data 222 using projection module 224 which may be one or more algorithms and/or models that are designed and/or trained segment greyscale perspective data 222 to determine greyscale segmentation data 226. Greyscale segmentation data may determine segments of the greyscale perspective data 222 and/or slices of such data. Depth segmentation module 232 may cause such data to undergo one or more convolutions. Projection module 224 may further determine views from various perspectives of the greyscale perspective data such as top down views, for example.

Computing device 210 may further process depth data using depth point cloud module 228, which may be one or more one or more algorithms and/or models that are designed and/or trained to determine a three-dimensional representation of the depth data such as a point cloud. For example, depth point cloud module 228 may generate and/or determine depth point cloud data 230 corresponding to depth information of depth data 218.

Computing device 210 may process depth point cloud data 230 using depth segmentation module 232. Depth segmentation module 232 may be one or more algorithms and/or models that are designed and/or trained to determine depth segmentation data 234. Depth segmentation module 234 may determine segments of the depth point cloud data and/or slices of such data. Depth segmentation module 232 may cause such data to undergo one or more convolutions. Depth segmentation module 232 may determine views from various perspective of the depth point cloud data 230 such as top down views, for example.

Figure 3B:
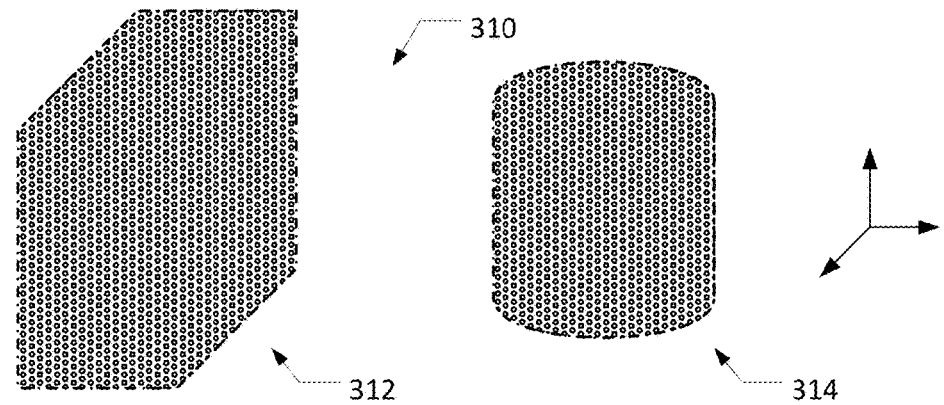
Figure 3C:
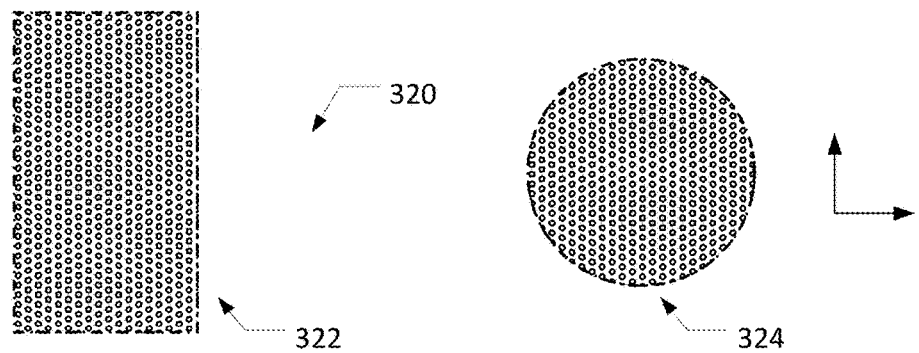

Referring now to FIGS. 3B-3C, exemplary schematic illustrations of the depth point cloud data and segmentation data are depicted, in accordance with one or more example embodiments of the present disclosure. As shown in FIG. 3, point cloud 310 is illustrated. Point cloud 310 corresponds to a depth point cloud generated from depth data determined by vehicle 302 in FIG. 3A. Point cloud 310 may include a plurality of points that are oriented with respect to one another in a three-dimensional space and is indicative of obstacle 304 and obstacle 306. Specifically, point cloud 310 includes three-dimensional representation 312 which is rectangular in shape and corresponds to obstacle 304 and three-dimensional representation 314 which is cylindrical in shape and corresponds to obstacle 306.

Referring now to FIG. 3C, top down view 320 is depicted, which is a top down view of point cloud 310 of FIG. 3B. As is shown in FIG. 3C, top down view 320 includes top down representation 322 which is a top down view of three-dimensional representation 312 of FIG. 3B as well as top down representations 324 which is a top down view of three-dimensional representation 314 of FIG. 3B. It is understood that top down view 320 may be set at any height or any depth. It is further understood that any angle or perspective view of the point cloud may be generated.

Referring again to FIG. 2, fusion module may combine (e.g., fuse) greyscale segmentation data 226 and depth segmentation data 224. For example, the segmented layers or slices of greyscale segmentation data 226 and depth segmentation data 224 may be combined to form an integrated three-dimensional representation. Alternatively, it is understood that any well-known fusion and/or combination techniques may be employed to combine some or all of the segmented layers or slices of greyscale segmentation data 226 and depth segmentation data 224.

Figure 4:
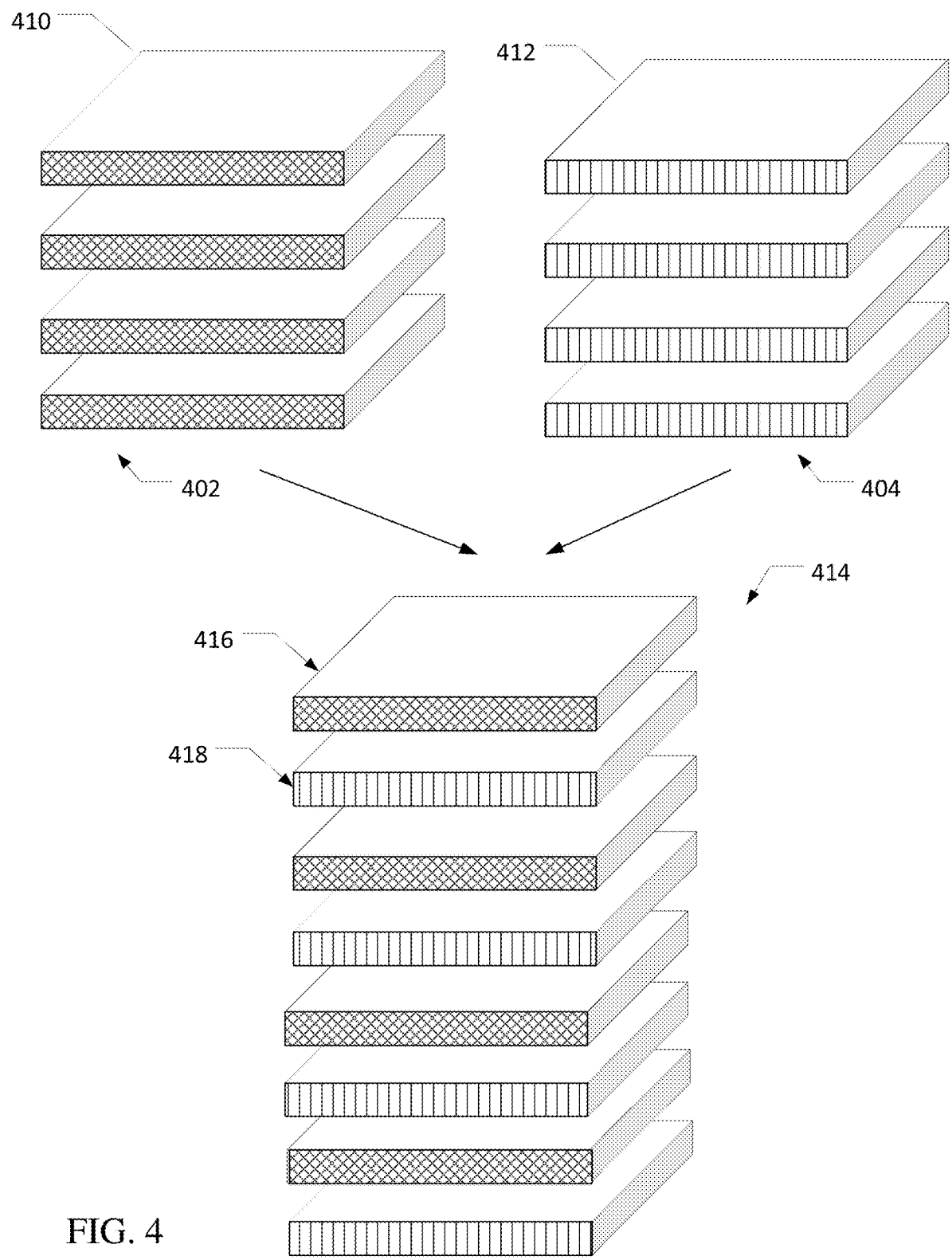
FIG. 4 is a schematic illustration of an example use case for fusing greyscale data and depth data, in accordance with one or more example embodiments of the present disclosure.

Referring now to FIG. 4, a schematic illustration of a representation of fused greyscale segmented data and depth segmented data is depicted, in accordance with one or more example embodiments of the present disclosure. As is shown in FIG. 4, greyscale segmentation data 402 is illustrated and may include greyscale perspective data 402 segmented into individual layers (e.g., first layer 410). Similarly, depth segmentation data 404 is illustrated and may include depth point cloud data segmented into individual layers (e.g., first layer 412) each.

As shown in FIG. 4, fused representation 414 may combine and/or fuse greyscale segmentation data 402 and the depth segmentation data 404. For example, the depth segmentation data 402 and the greyscale segmentation data 404 may be combined layer-by-layer. In one example, first layer 410 of the greyscale segmentation data 402 may be combined with first layer 412 of depth segmentation data 404. It is understood that the process of analyzing the greyscale data and depth data using one or more of the perspective module, depth point cloud module, projection module, depth segmentation module, and/or fusion module, the greyscale data and/or the depth data may be processed by one or more neural networks and/or may have undergone one or more convolutions. It is further understood that by combining and/or fusing the greyscale data with the depth data, failure to determine environmental data by one type of data will be offset by detection in the other type of data.

Referring again to FIG. 2, fusion module 236 may determine and/or generate the combined greyscale and depth data to form an integrated three-dimensional representation and based on this integrated representation may determine obstacle data. For example, obstacle data 238 may correspond to a top down view of the integrated three-dimensional representation top a given height. Obstacle data may further include an obstacle map which may be a representation of the obstacle data. Computing device 210 may send the obstacle data 238 to computing device 240.

Computing device 240 may receive the obstacle data and process the obstacle data using navigation module 204. Navigation module 204 may be programmed to determine navigation data 242 which may be a path for the vehicle situated in the environment. The path determined by the vehicle may be based on the obstacle data and thus may avoid any obstacles identified by and/or present in the obstacle data. Alternatively, computing device 210 may include navigation module 204 and may determine navigation data 242 based on the obstacle data and send computing device 240 the navigation data 242.

Figure 5A:
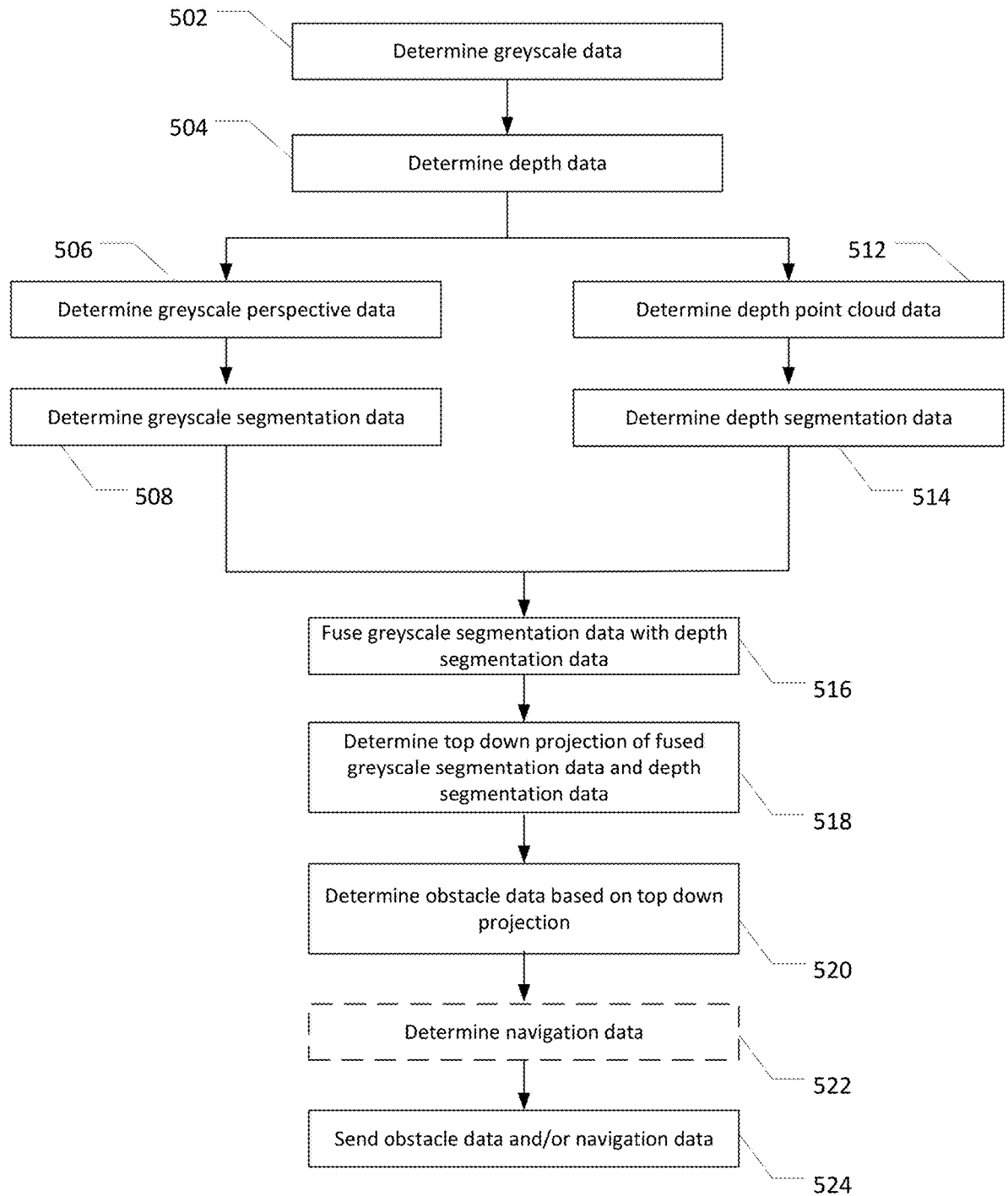
FIG. 5A-5B. are schematic illustrations of example process flows for determining an obstacle map and navigation data, in accordance with one or more example embodiments of the present disclosure.
Figure 5B:
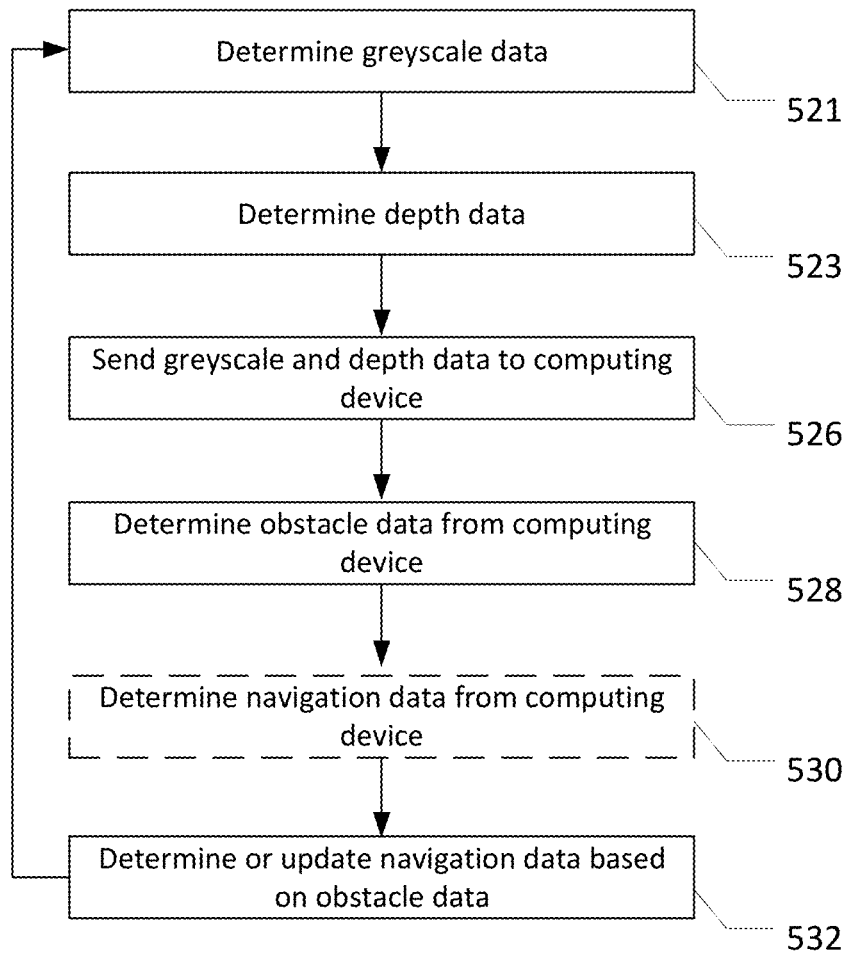

Referring now to FIGS. 5A-5B, example process flows for determining obstacle data and navigation data are depicted, in accordance with one or more example embodiments of the present disclosure. Some or all of the blocks of the process flows in this disclosure may be performed in a distributed manner across any number of devices (e.g., computing devices and/or servers). Some or all of the operations of the process flow may be optional and may be performed in a different order.

Referring now to FIG. 5A, an exemplary process flow for determining obstacle data using the computing device is illustrated. At block 502, computer-executable instructions stored on a memory of a device, such as a computing device, may be executed to determine greyscale data. It is understood that greyscale data may be any type of data with color information (e.g., red-green-blue (RBG) data and/or greyscale data). At block 504, computer-executable instructions stored on a memory of a device, such as a computing device, may be executed to determine depth data. As explained above, the greyscale data and depth data may be generated by one or more sensors on a vehicle and received from a vehicle.

At block 506, computer-executable instructions stored on a memory of a device, such as a computing device, may be executed to determine greyscale perspective data to determine a three-dimensional representation of the greyscale data. At block 508 computer-executable instructions stored on a memory of a device, such as a computing device, may be executed to determine greyscale segmentation data from the greyscale perspective data.

At block 512, computer-executable instructions stored on a memory of a device, such as a computing device, may be executed to determine depth point cloud data to determine a three-dimensional representation of the depth data. At block 514 computer-executable instructions stored on a memory of a device, such as a computing device, may be executed to determine depth segmented data from the greyscale perspective data.

At block 516, computer-executable instructions stored on a memory of a device, such as a computing device, may be executed to fuse and/or combine together the greyscale segmentation data with the depth segmentation data (e.g., layer by layer). At block 518, computer-executable instructions stored on a memory of a device, such as a computing device, may be executed to determine a top down projection of fused greyscale segmentation data and depth segmentation data. At block 520 computer-executable instructions stored on a memory of a device, such as a computing device, may be executed to determine obstacle data based on a top down view of the combined and/or fused greyscale segmentation data and depth segmentation data. In one example, obstacle data may include an obstacle map.

At optional block 522, computer-executable instructions stored on a memory of a device, such as a computing device, may be executed to determine navigation data based on the top down projection. At optional block 524, computer-executable instructions stored on a memory of a device, such as a computing device, may be executed to send the navigation data and/or obstacle data to the vehicle. It is understood that the process set forth in FIG. 5A may be repeated each time new sensor data (e.g., greyscale data and depth data) is received by the computing device.

Referring now to FIG. 5B, an exemplary process flow for determining navigation data is depicted. At block 521, computer-executable instructions stored on a memory of a device, such as a computing device, may be executed to determine greyscale data. It is understood that greyscale data may be any type of data with color information (e.g., red-green-blue (RBG) data and/or greyscale data). At block 523, computer-executable instructions stored on a memory of a device, such as a computing device, may be executed to determine greyscale data. At block 526, computer-executable instructions stored on a memory of a device, such as a computing device, may be executed to send the greyscale and depth data to a computing device.

At block 528, computer-executable instructions stored on a memory of a device, such as a computing device, may be executed to determine obstacle data from the computing device, which may include an obstacle map. At optional block 530, computer-executable instructions stored on a memory of a device, such as a computing device, may be executed to determine navigation data from the computing device. At block 528, computer-executable instructions stored on a memory of a device, such as a computing device, may be executed to determine or update navigation data based on the obstacle data. After block 532, block 522 may be reinitiated.

Figure 6B:
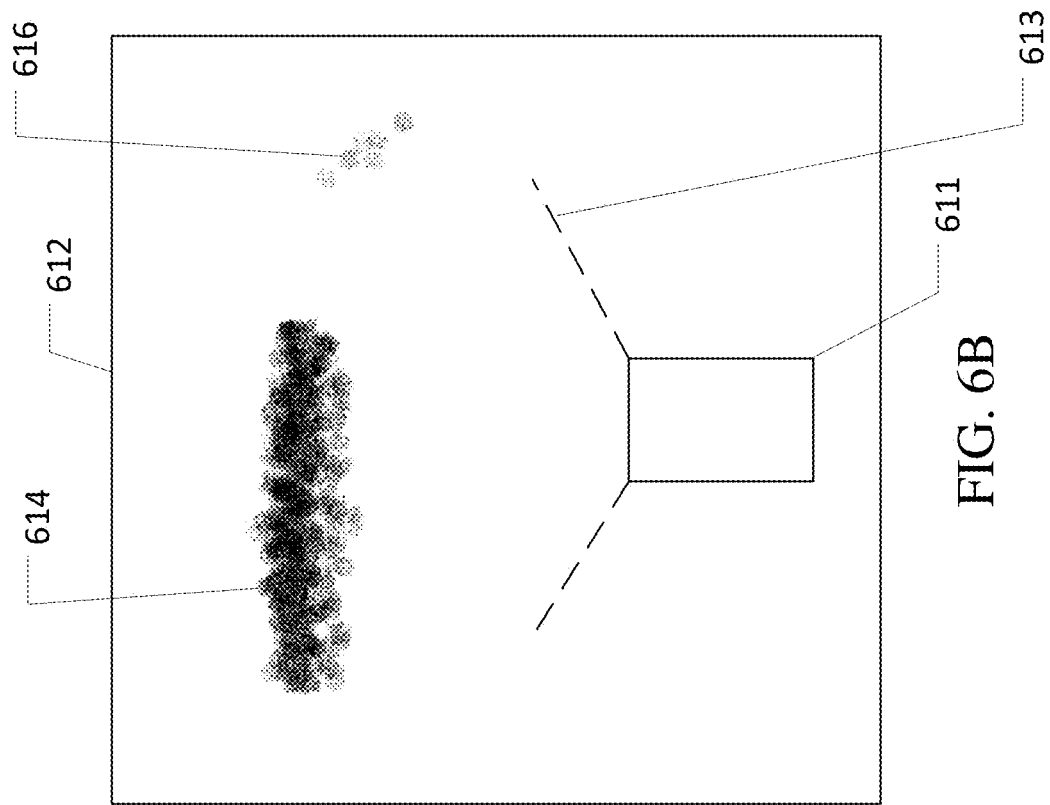
FIGS. 6A-6B are schematic illustrations of obstacle data and an obstacle map in accordance with one or more example embodiments of the disclosure.
Figure 6A:
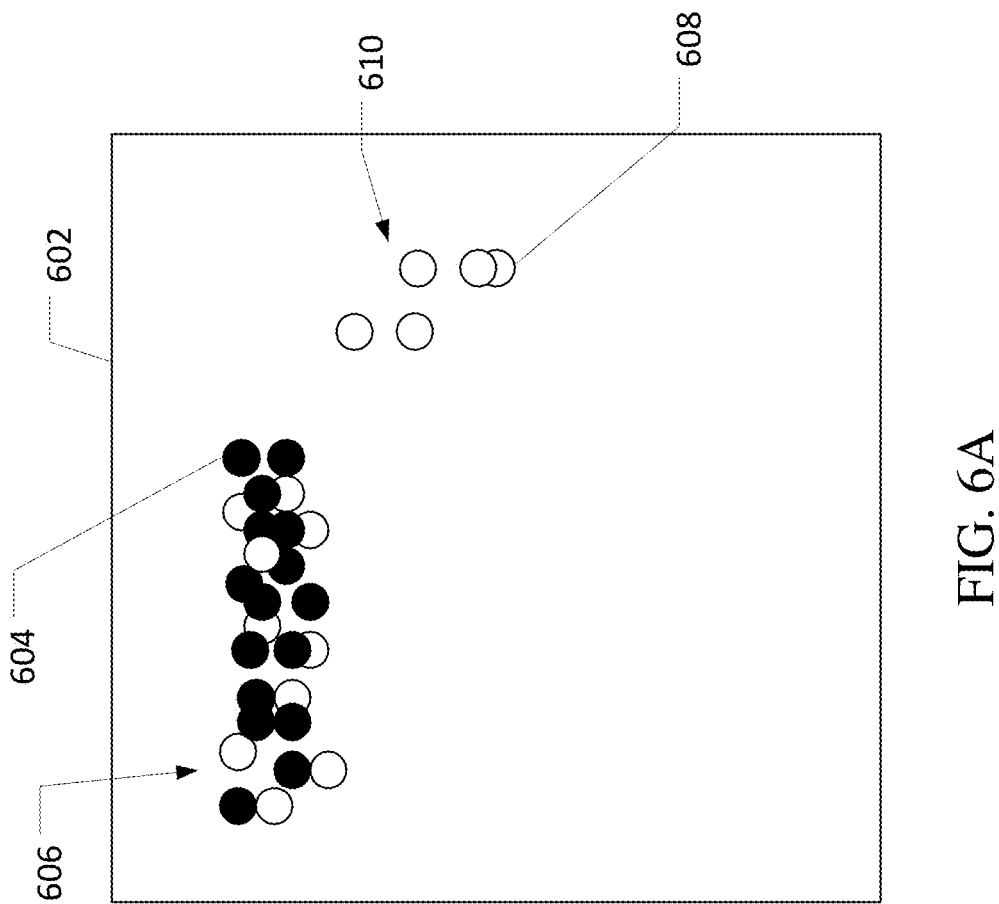

Referring now to FIGS. 6A-6B, schematic illustrations of obstacle data and an obstacle map are depicted in accordance with one or more example embodiments of the disclosure. FIG. 6A illustrates a top down view 602 of a combined and/or fused greyscale segmentation data and depth segmentation data. In the example illustrated in FIG. 6A, greyscale segmentation data 604 may indicate the presence of obstruction 606. Depth segmentation data 608 may indicate the presence of obstruction 606 as well as obstruction 608. The trained algorithms and models of the computing device may determine if obstruction 608 is error of omission by greyscale segmentation data 604 or is a false detection by depth segmentation data 608. It is understood that a height threshold value may be determined (e.g., height of the vehicle) and may be compared to the obstacle data to determine whether to disregard one or more identified obstacles. For example, the height of the vehicle may be below the height of an obstruction.

Referring now to FIG. 6B, an exemplary obstacle map 612 is depicted. Obstacle map 612 may be based off of obstacle data 602 and may be a graphical representation of obstacle data 602. For example, obstacle map may indicate the presence of obstruction 614 relative to vehicle 611. Obstruction 614 may correspond to obstruction 608. Obstacle map 612 may further include a representation of obstruction 616, which may correspond to obstruction 610. However, obstacle map 612 may present obstruction 616 in a different color if it is determined that such obstruction is traversable. Vehicle view 613 may further indicate the field of vision of the vehicle 611.

Referring now to FIG. 7A-B, an exemplary obstacle map and annotated obstacle map are illustrated, in accordance with one or more example embodiments of the disclosure. FIG. 7A illustrates an exemplary obstacle map 702. Obstacle map 702 may include visual images generated by the vehicle (e.g., cameras on the vehicle) corresponding to the obstacle 702. For example, front view 704 and rear view 706 may indicate the front view and rear view of the vehicle. The obstacle map 702 may further include obstructions 708 in black and possible obstructions 712 as well as vehicle representation 712 orientated with respect to obstructions 708 and possible obstructions 712. It is understood that possible obstructions 710 may be indicated by the navigation system as possibly traversable. Alternatively, possible obstructions 710 may be indicated by the navigation system as non-traversable Referring now to FIG. 7B, an exemplary annotated obstacle map 722 is illustrated. It is understood that the obstacle map illustrated in FIG. 7A may be used to insert manual annotations to further train the algorithms and/or models described herein. For example, annotated obstacle map 722 may be annotated to indicate the presence of one or more obstructions and/or to disregard one or more obstructions. As is shown in FIG. 7B, annotation 726 may indicate that an area of the annotated obstacle map 722 corresponds to an obstruction and thus is not traversable (e.g., unpassable). Conversely, annotation 728 may indicate that an area of the annotated obstacle map is traversable. The Annotated obstacle map 722 may include a key 725 to aid a user in annotating the map. Further annotated obstacle map 722 may include front view 704 and rear view 706 to aid a user in determining whether an area is traversable. Annotated obstacle map 722 may then be used to train one or more algorithms and/or models of the navigation system. It is understood that obstacle map 702 and/or annotated obstacle map 722 may include a grid system for allocating sections of the obstacle maps to portions of the grid and otherwise facilitating analyzing information included in the obstacle map.

Figure 8B:
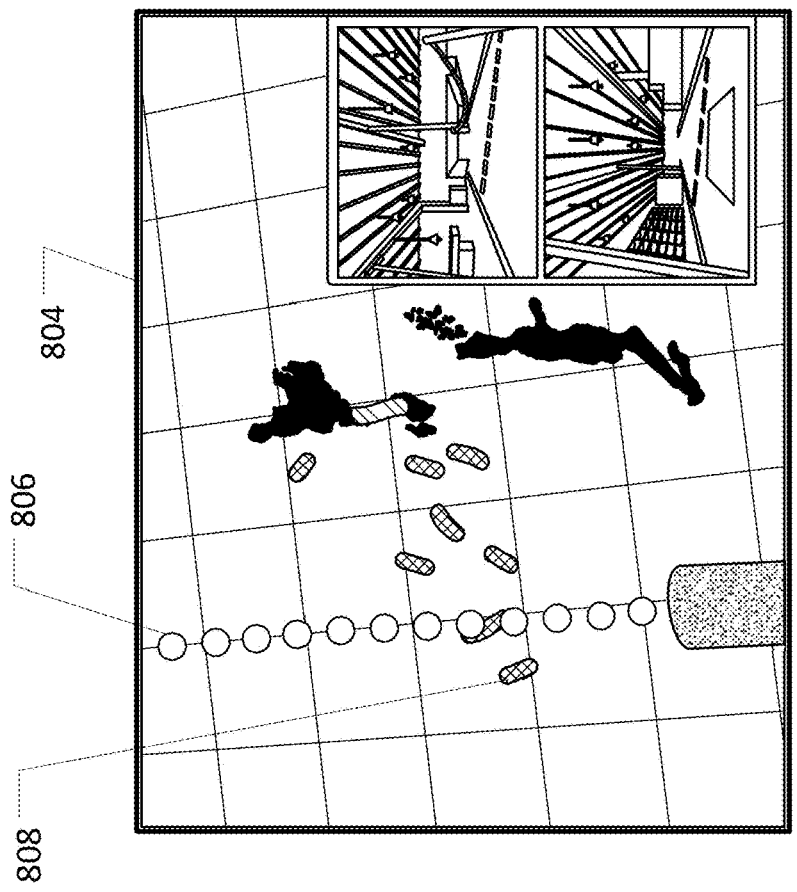
FIGS. 8A-8B are schematic illustrations of various navigations in accordance with one or more example embodiments of the disclosure.
Figure 8A:
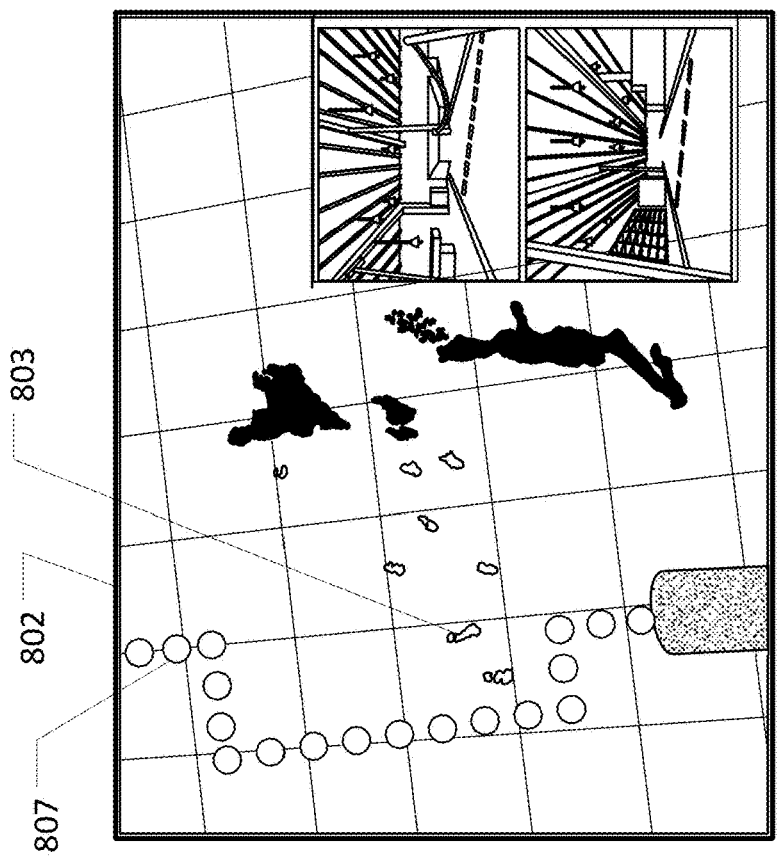

Referring now to FIGS. 8A-8B, schematic illustrations of various navigation paths are depicted, in accordance with one or more example embodiments of the disclosure. FIG. 8A illustrates an obstacle map 802 that is similar to obstacle map 702 of FIG. 7A. In obstacle map 802, the navigation system may deem that possible obstructions 803 are non-traversable and thus a navigation module processing the obstacle map 802 and/or obstacle data corresponding thereto may determine a navigation path 807 that avoids obstructions 803.

Referring now to FIG. 8B, an corrected obstacle map 804 is depicted. As is shown in corrected obstacle map 804, the possible obstructions 808 are deemed traversable by the navigation system. Accordingly, the navigation module may determine navigation path 806 which may traverse possible obstructions 808. The navigation module may make this determination after the algorithms and/or models of navigation system are trained with annotated obstacle maps. As is shown in FIG. 8B, navigation path 806 may be a more direct path than navigation path 807 of FIG. 8A, thereby saving time and resources (e.g., battery power).

Illustrative Device Architecture

Figure 9:
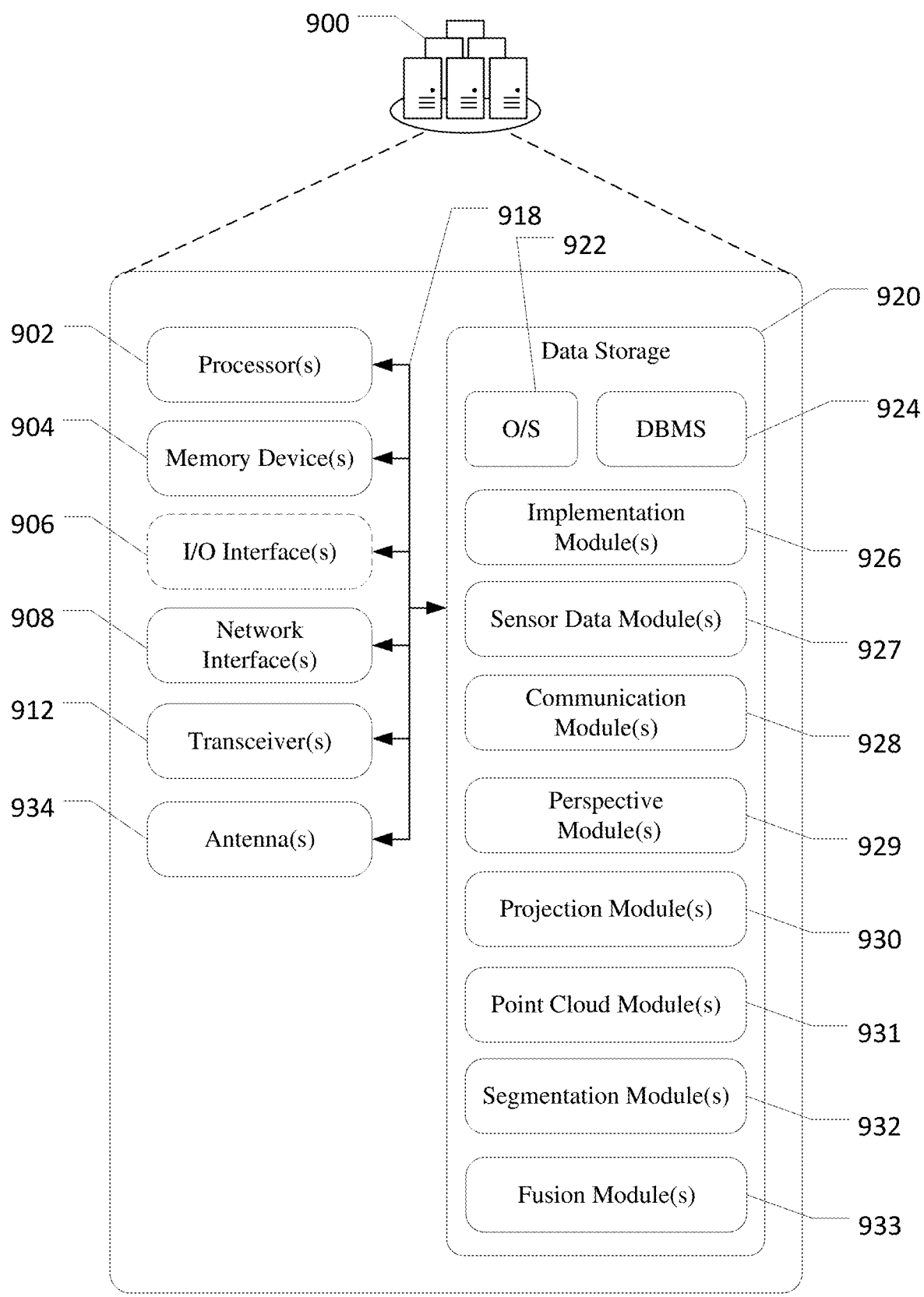
FIG. 9 is a schematic block diagram of a computing device in accordance with one or more example embodiments of the disclosure.

FIG. 9 is a schematic block diagram of a computing device 900 in accordance with one or more example embodiments of the disclosure. The computing device 900 may be one or more computing devices and/or servers and may include any suitable computing device capable of receiving and/or sending data, and may optionally be coupled to devices including, but not limited to, computing devices such as a connected device, smartphone, tablet, smart television, e-reader, one or more user devices (e.g., wearable devices and/or smart sensors), a desktop computer, a laptop computer, one or more servers, datastores, or the like. The computing device 900 may correspond to an illustrative device configuration for any computing device of FIGS. 1-8 and/or any computing devices running the navigation system. For example, computing device 900 may be the same as computing device 110 of FIG. 1.

The computing device 900 may be configured to communicate via one or more networks with one or more servers, electronic devices, vehicles, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 900 may include one or more processors (processor(s)) 902, one or more memory devices 904 (generically referred to herein as memory 904), one or more of the optional input/output (I/O) interface(s) 906, one or more network interface(s) 908, one or more transceivers 912, and one or more antenna(s) 934. The computing device 900 may further include one or more buses 918 that functionally couple various components of the computing device 900. The computing device 900 may further include one or more antenna(e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the computing device 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the computing device 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 804 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like such as, for example, one or more implementation module(s) 926, one or more sensor data module(s) 927, one or more communication module(s) 928, one or more perspective modules(s) 929, one or more projection module(s) 930, one or more point cloud module(s) 931, one or more segmentation module(s) 932, and/or one or more fusion module(s) 933. Some or all of these module(s) may be sub-module(s). Sub or all of these module(s) may be part of the product platform and some or all of these modules may be part of the synthetic platform. Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the computing device 900. Any data stored in the data storage 920 may be loaded into the memory 804 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, user preference information, user contact data, device pairing information, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the computing device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the implementation module(s) 926 may include computer-executable instructions, code, or the like that responsive to execution by one or more of the processor(s) 902 may perform functions including, but not limited to, overseeing coordination and interaction between one or more modules and computer executable instructions in data storage 920 and/or determining user selected actions and tasks. Implementation module 926 may further coordinate with communication module 928 to send messages to and receive messages from the computing device.

The sensor module(s) 927 may include computer-executable instructions, code, or the like that responsive to execution by one or more of the processor(s) 902 may perform functions including, but not limited to, determining sensor data from a vehicle and/or another computing device. Sensor module 927 may further process the sensor data, determine greyscale and/or depth sensor data, and/or preprocess the sensor data (e.g. to remove noise).

The communication module(s) 928 may include computer-executable instructions, code, or the like that responsive to execution by one or more of the processor(s) 902 may perform functions including, but not limited to, communicating with one or more computing devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The Perspective module(s) 929 may include computer-executable instructions, code, or the like that responsive to execution by one or more of the processor(s) 802 may perform functions including, but not limited to, processing greyscale data and determining a three-dimensional representation of the greyscale data. For example, greyscale data may be based on color information and such information may be used to determine the three-dimensional representation of the greyscale data.

The projection module(s) 930 may include computer-executable instructions, code, or the like that responsive to execution by one or more of the processor(s) 802 may perform functions including, but not limited to, segmenting the three-dimensional representation of the greyscale data and/or determining perspective views of the three-dimensional data such as a top-down view.

The point cloud module(s) 931 may include computer-executable instructions, code, or the like that responsive to execution by one or more of the processor(s) 802 may perform functions including, but not limited to, determining three-dimensional representation of the depth data. For example, the depth data may include depth information which may be used to plot points on a three-dimensional coordinate system based on the depth information.

The segmentation module(s) 932 may include computer-executable instructions, code, or the like that responsive to execution by one or more of the processor(s) 802 may perform functions including, but not limited to, segmenting the point cloud corresponding to the depth data and/or determining perspective views of the point cloud, such as a top-down view.

The fusion module(s) 833 may include computer-executable instructions, code, or the like that responsive to execution by one or more of the processor(s) 802 may perform functions including, but not limited to, combining the three-dimensional representation of the depth data (e.g., the point cloud) as well as the three-dimensional representation of the greyscale data. For example, the fusion module may combine the three-dimensional representation of the depth data and the three-dimensional representation of the greyscale data, layer-by-layer.

Referring now to other illustrative components depicted as being stored in the data storage 920, the O/S 922 may be loaded from the data storage 920 into the memory 904 and may provide an interface between other application software executing on the computing device 900 and hardware resources of the computing device 900. More specifically, the O/S 922 may include a set of computer-executable instructions for managing hardware resources of the computing device 900 and for providing common services to other application programs (e.g., managing memory allocation among various application programs). In certain example embodiments, the O/S 922 may control execution of the other program module(s) to for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 824 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 900, the optional input/output (I/O) interface(s) 906 may facilitate the receipt of input information by the computing device 900 from one or more I/O devices as well as the output of information from the computing device 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 900 or may be separate. The I/O devices may further include, for example, any number of peripheral devices such as data storage devices, printing devices, and so forth.

The optional I/O interface(s) 906 may also include an interface for an external peripheral device connection such as universal serial bus (USB), Fire Wire, Thunderbolt, Ethernet port or other connection protocol that may connect to one or more networks. The optional I/O interface(s) 906 may also include a connection to one or more of the antenna (e) 934 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 900 may further include one or more network interface(s) 908 via which the computing device 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna (e) 934 may include any suitable type of antenna depending, for example, on the communications protocols used to transmit or receive signals via the antenna (e) 934. Non-limiting examples of suitable antennas may include directional antennas, non-directional antennas, dipole antennas, folded dipole antennas, patch antennas, multiple-input multiple-output (MIMO) antennas, or the like. The antenna (e) 934 may be communicatively coupled to one or more transceivers 912 or radio components to which or from which signals may be transmitted or received.

As previously described, the antenna(e) 934 may include a Bluetooth antenna configured to transmit or receive signals in accordance with established standards and protocols, such as Bluetooth and/or BLE. Alternatively, or in addition to, antenna (e) 934 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 934 may be configured to transmit or receive radio frequency signals within any suitable frequency range forming part of the unlicensed portion of the radio spectrum (e.g., 900 MHz).

The antenna(e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 934—transmitting or receiving radio frequency (RF) signals in the bandwidth and/or channels corresponding to the communications protocols utilized by the computing device 900 to communicate with other devices. The transceiver(s) 912 may include hardware, software, and/or firmware for modulating, transmitting, or receiving—potentially in cooperation with any of antenna (e) 934—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computing device 900. The transceiver(s) 912 may further include a low noise amplifier (LNA), additional signal amplifiers, an analog-to-digital (A/D) converter, one or more buffers, a digital baseband, or the like.

Figure 10:
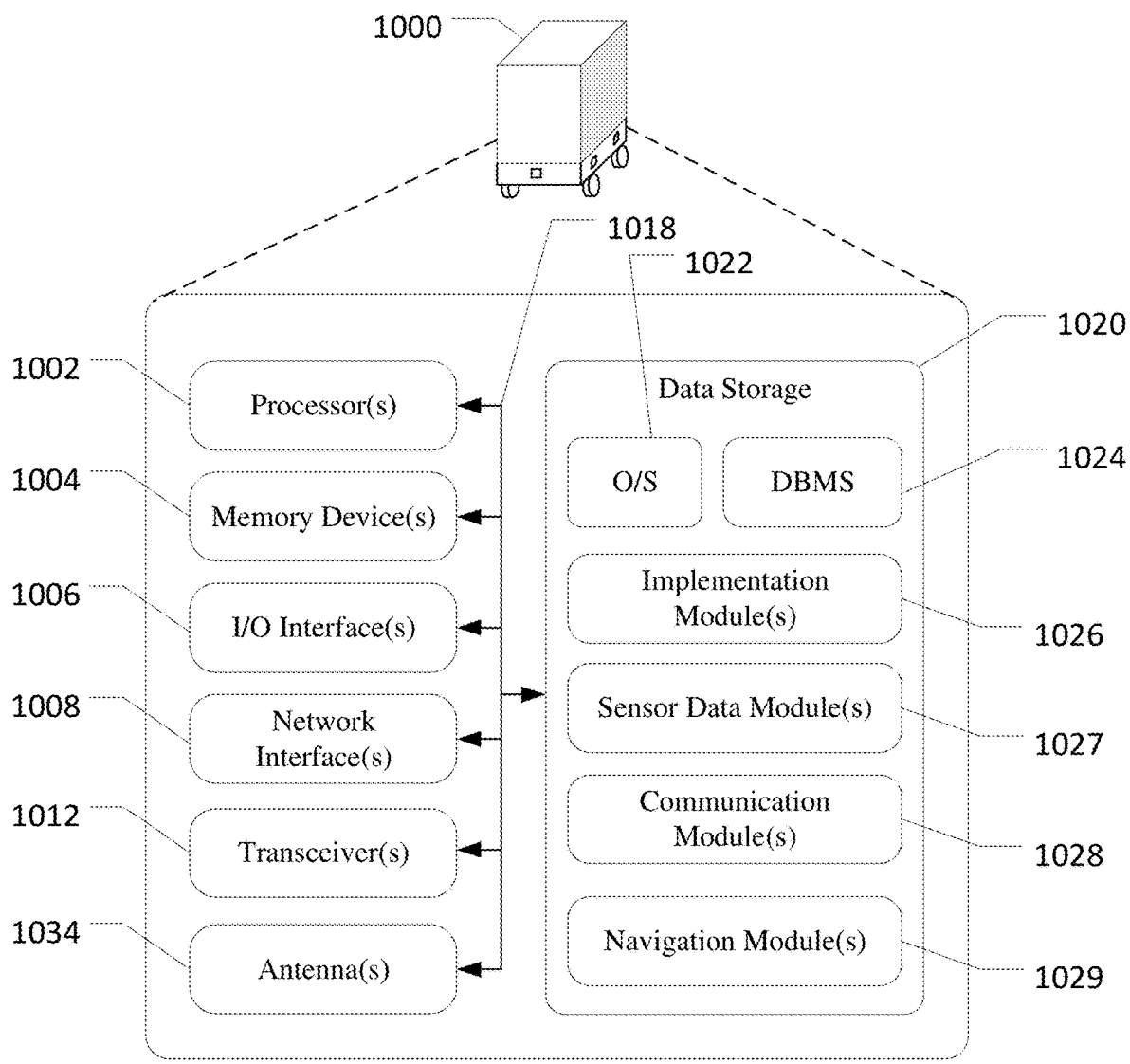
FIG. 10 is a schematic block diagram of a vehicle in accordance with one or more example embodiments of the disclosure.

FIG. 10 is a schematic block diagram of a computing vehicle 1000 in accordance with one or more example embodiments of the disclosure. The computing vehicle 1000 may be an autonomous vehicle and may include a computing device capable of receiving and/or sending data as well as a processing sensor data, and may be coupled to other computing devices such as a server, for example. vehicle 1000 may correspond to vehicle 102 of FIG. 1 and/or and any other vehicle of FIGS. 1-8.

The vehicle 1000 may be configured to communicate via one or more networks with one or more computing devices, servers, user devices, electronic devices, tablets, wearables, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the vehicle 1000 may include one or more processors (processor(s)) 1002, one or more memory devices 1004 (generically referred to herein as memory 1004), one or more optional input/output (I/O) interface(s) 1006, one or more network interface(s) 1008, one or more transceivers 1012, one or more antenna(s) 1034, and data storage 1020. The computing device 1000 may further include one or more buses 1018 that functionally couple various components of the vehicle 1000. These various components will be described in more detail hereinafter.

The vehicle 1000 may further include one or more antenna (e) 1034 that may have the same or substantially the same features, operation, and/or functionality as described above with respect to antenna (e) 1034. The bus(es) 1018 may have the same or substantially the same features, operation, and/or functionality as described above with respect to bus(es) 1018. The memory 1004 may have the same or substantially the same features, operation, and/or functionality as described above with respect to memory 1004.

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 920 for non-volatile storage.

More specifically, the data storage 1020 may store one or more operating systems (O/S) 1022; one or more optional database management systems (DBMS) 1024; and one or more program module(s), applications, engines, computer-executable code, scripts, or the like such as, for example, one or more implementation module(s) 1026, one or more sensor data module(s) 1027, one or more communication module(s) 1028, and/or one or more navigation module(s) 1029. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 920 may support functionality described in reference to correspondingly named components earlier in this disclosure.

The data storage 1020 may further store various types of data utilized by components of the vehicle 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 924 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute computer-executable instructions loaded therein. For example, the processor(s) 1002 may be configured to execute computer-executable instructions of the various program module(s), applications, engines, or the like of the computing device 900 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 11, the implementation module(s) 1026 may include computer-executable instructions, code, or the like that responsive to execution by one or more of the processor(s) 1002 may perform functions including, but not limited to, overseeing coordination and interaction between one or more modules and computer executable instructions in data storage 1020 and/or determining user selected actions and tasks. Implementation module 1026 may further coordinate with communication module 1028 to send messages to and receive messages from a server (e.g., computing device 1000 of FIG. 10).

The sensor module(s) 1027 may include computer-executable instructions, code, or the like that responsive to execution by one or more of the processor(s) 1002 may perform functions including, but not limited to, determining sensor data using one or more sensors of I/O interface 1006. For example, sensor module 1027 may determine greyscale data, depth data, and/or any other sensor data.

The communication module(s) 1028 may include computer-executable instructions, code, or the like that responsive to execution by one or more of the processor(s) 902 may perform functions including, but not limited to, communicating with one or more computing devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The navigation module module(s) 1029 may include computer-executable instructions, code, or the like that responsive to execution by one or more of the processor(s) 902 may perform functions including, but not limited to, determining navigation data (e.g., a navigation path) corresponding to the environment in which the vehicle is situated. Navigation module 1029 may analyze obstacle data generated by a computing device (e.g., computing device 110 of FIG. 1).

Referring now to other illustrative components depicted as being stored in the data storage 1020, the O/S 1022 may be loaded from the data storage 1020 into the memory 1004 and may provide an interface between other application software executing on the vehicle 1000 and hardware resources of the computing device 1000. More specifically, the O/S 1022 may include a set of computer-executable instructions for managing hardware resources of the vehicle 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 924 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the vehicle 1000, the optional input/output (I/O) interface(s) 1006 may have the same or substantially the same features, operation, and/or functionality as described above with respect to input/output (I/O) interface(s) 1006 and/or may include one or more sensors (e.g., stereo sensors). The vehicle 1000 may further include one or more network interface(s) 1008 via which the vehicle 1000 may communicate with any of a variety of other systems, platforms, networks, devices, and so forth. The network interface(s) 1008 may enable communication, for example, with one or more servers, computing devices, one or more wireless routers, one or more host servers, one or more web servers, and the like via one or more of networks. The transceiver(s) 1012 may have the same or substantially the same features, operation, and/or functionality as described above with respect to transceiver(s) 912.

It should be appreciated that the program module(s), applications, computer-executable instructions, code, or the like depicted in FIG. 9 as being stored in the data storage 920, or depicted in FIG. 10 as being stored in the data storage 1020, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 900, vehicle 1000 and/or hosted on other computing device(s) accessible via one or more networks, may be provided to support functionality provided by the program module(s), applications, or computer-executable code depicted in FIG. 9, FIG. 10 and/or additional or alternate functionality. Further, functionality may be modularized differently such that processing described as being supported collectively by the collection of program module(s) depicted in FIG. 9 and/or or FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 and/or FIG. 10 may be implemented, at least partially, in hardware and/or firmware across any number of devices.

It should further be appreciated that the vehicle 1000 and/or computing device 900 may include alternate and/or additional hardware, software, or firmware components beyond those described or depicted without departing from the scope of the disclosure. More particularly, it should be appreciated that software, firmware, or hardware components depicted as forming part of the computing device 900 and/or vehicle 1000 are merely illustrative and that some components may not be present or additional components may be provided in various embodiments. While various illustrative program module(s) have been depicted and described as software module(s) stored in data storage 1020 and/or data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining first data corresponding to color information associated with an environment;
   determining second data corresponding to first depth information associated with the environment;
   determining second depth information based on the color information associated with the first data;
   determining third data based on the second depth information, the third data indicative of a three-dimensional representation of the first data;
   determining fourth data based on the second data, the fourth data indicative of a point cloud corresponding to the second data;
   determining fifth data by combining the fourth data with the third data;
   determine a first obstacle based on the fifth data; and determine the first obstacle is traversable based on the fifth data.

2. The method of claim 1, further comprising:
determining first segmented layers of the third data;
determining second segmented layers of the fourth data; and
combining the first segmented layers with the second segmented layers.

3. The method of claim 1, further comprising determining a top down view of the fifth data, the top down view corresponding to the first obstacle.

4. The method of claim 3, further comprising:
determining an obstacle map based on the top down view of the fifth data, the obstacle map indicative of obstacles in the environment;
sending the obstacle map to a first device.

5. The method of claim 3, further comprising causing a first device to autonomously navigate the environment based on the top down view of the fifth data.

6. The method of claim 1, further comprising:
determining a second obstacle based on the fifth data; and
determining the second obstacle is unpassable based on the fifth data.

7. The method of claim 1, further comprising:
processing the first data using a machine learning model, the machine learning model trained to determine depth information associated with greyscale data.

8. The method of claim 1, further comprising:
processing the first data and the second data using a machine learning model; and
training the machine learning model using an annotated obstacle map including one or more traversable obstacles.

9. A system comprising:
a first computing device having memory configured to store computer-executable instructions, and at least one computer processor configured to access the memory and execute the computer-executable instructions to:
determine first data corresponding to color information associated with an environment;
determine second data corresponding to first depth information associated with the environment;
determine second depth information based on the color information associated with the first data;
determine third data based on the second depth information, the third data indicative of a three-dimensional representation of the first data;
determine fourth data based on the second data, the fourth data indicative of a point cloud corresponding to the second data;
determine fifth data by combining the fourth data with the third data;
determine a first obstacle based on the fifth data; and
determine the first obstacle is traversable based on the fifth data.

10. The system of claim 9, wherein the at least one computer processor is further configured to access memory and execute the computer-executable instructions to:
determine first segmented layers of the third data;
determine second segmented layers of the fourth data; and
combine the first segmented layers with the second segmented layers.

11. The system of claim 9, wherein the at least one computer processor is further configured to access memory and execute the computer-executable instructions to determine a top down view of the fifth data, the top down view corresponding to the first obstacle.

12. The system of claim 11, wherein the at least one computer processor is further configured to access memory and execute the computer-executable instructions to:
determine an obstacle map based on the top down view of the fifth data, the obstacle map indicative of obstacles in the environment;
send the obstacle map to a first device.

13. The system of claim 11, wherein the at least one computer processor is further configured to access memory and execute the computer-executable instructions to:
cause a first device to autonomously navigate the environment based on the top down view of the fifth data.

14. The system of claim 9, wherein the at least one computer processor is further configured to access memory and execute the computer-executable instructions to:
determine a second obstacle based on the fifth data; and
determine the second obstacle is unpassable based on the fifth data.

15. The system of claim 9, wherein the at least one computer processor is further configured to access memory and execute the computer-executable instructions to:
processing the first data using a machine learning model, the machine learning model trained to determine depth information associated with greyscale data.

16. The system of claim 9, wherein the at least one computer processor is further configured to access memory and execute the computer-executable instructions to:
process the first data and the second data using a machine learning model; and
train the machine learning model using an annotated obstacle map including one or more traversable obstacles.

* * * * *